(12) United States Patent
Cole

(10) Patent No.: US 7,944,066 B2
(45) Date of Patent: May 17, 2011

(54) GRAVITATIONAL AND AIR TRANSFER ELECTRICAL GENERATION

(76) Inventor: Jeff Cole, Hamilton (CA)

( * ) Notice: Subject to any disclaimer, the term of this patent is extended or adjusted under 35 U.S.C. 154(b) by 720 days.

(21) Appl. No.: 11/552,164

(22) Filed: Oct. 24, 2006

(65) Prior Publication Data

US 2007/0096470 A1 May 3, 2007

(30) Foreign Application Priority Data

Oct. 24, 2005 (CA) ...................................... 2524238
Aug. 4, 2006 (CA) ...................................... 2555562

(51) Int. Cl.
*F03B 13/10* (2006.01)
*F03B 13/12* (2006.01)
*H02P 9/04* (2006.01)

(52) U.S. Cl. ........................................... 290/42; 290/43
(58) Field of Classification Search ..................... 290/42, 290/43, 53, 54, 1 R; 60/325, 498, 495, 496, 60/504, 497

See application file for complete search history.

(56) References Cited

U.S. PATENT DOCUMENTS

| | | | | |
|---|---|---|---|---|
| 3,587,227 A | * | 6/1971 | Weingarten | 60/326 |
| 3,961,479 A | * | 6/1976 | Anderson | 60/496 |
| 4,249,085 A | * | 2/1981 | Kertzman | 290/53 |
| 4,342,920 A | * | 8/1982 | Bucknam | 290/1 R |
| 4,718,232 A | * | 1/1988 | Willmouth | 60/495 |
| 4,726,188 A | * | 2/1988 | Woolfolk | 60/496 |
| 4,805,406 A | * | 2/1989 | Grsetic | 60/496 |
| 6,018,947 A | * | 2/2000 | DeMarco et al. | 60/496 |
| 6,964,165 B2 | * | 11/2005 | Uhl et al. | 60/495 |
| 2006/0017292 A1 | * | 1/2006 | Matsubara | 290/43 |
| 2006/0267346 A1 | * | 11/2006 | Chen | 290/54 |
| 2007/0080540 A1 | * | 4/2007 | Tung | 290/43 |
| 2007/0283689 A1 | * | 12/2007 | McGahee | 60/495 |

* cited by examiner

*Primary Examiner* — Julio Gonzalez

(57) ABSTRACT

An improved system for generating electricity by harnessing natural gravitational forces, wherein a plurality of vessels are placed at the bottom of a deep enclosed chamber of liquid. The vessels are secured around tracking cables which extend within the chamber and are held in place by the air lock. Each vessel also has a retention system. The vessels collect released pressurized air through bottom openings and when the air lock is released, the vessels rush to the surface of the chamber along tracking cables. When the vessels are released, the collective force of their release rotates a crankshaft to generate electricity. The process will employ a systematic transfer of air within multiple tanks and collection areas with the use of varying pressure relief valves. This will allow air to be transferred through out the system without being pumped from an external energy source.

8 Claims, 4 Drawing Sheets

US 7,944,066 B2

GRAVITATIONAL AND AIR TRANSFER ELECTRICAL GENERATION

FIELD OF THE INVENTION

The present invention relates to the generation of electricity through mechanical generation, and, more particularly, to the generation of electricity through mechanical generation which harnesses natural gravitational forces.

DESCRIPTION OF THE PRIOR ART

With energy consumption hitting record levels, there is need for clean sources of electricity and electrical generation. Conventional methods for generating electricity include fossil power, fossil fuel, nuclear power, wind power and gravity systems which utilize water which is re-circulated to operate a water wheel type driven electrical generator. An example of this latter type of gravity generating system is illustrated in U.S. Pat. No. 5,905,312.

However, hydro power is not always available, nor is wind power available in many locations, and these locations generally must rely on fossil fuel or nuclear plants which generate pollution of one form or another.

The gravity electrical generating system of the present invention has the advantage of providing electrical generation systems which does not utilize fossil fuel or nuclear power, and has the further advantage of providing electrical generation more efficiently than the gravity generating system described in U.S. Pat. No. 5,905,312.

SUMMARY OF THE INVENTION

The object of the present invention is to provide an improved hydro-electrical generation system able to generate electricity in a waste free and fuel free manner.

It is another object of the present invention to provide an improved hydro-electrical generation system which produces electricity through mechanical generation, by harnessing natural gravitational forces. As such, there are no limitations as to where the present invention can be utilized.

According to one aspect of the present invention, there is provided a system for generating electricity by gravity comprising an enclosed chamber, the enclosed chamber being filled with a quantity of liquid therein; an electric generator for generating electricity; a plurality of containers for guided up and down travel between a lower portion and an upper portion of the enclosed chamber, the containers being connected in driving engagement with the electric generator; guide means for guiding the up and down travel of the containers between the lower portion and the upper portion of the enclosed chamber; and valve means for filling the containers with air when the containers attain a position in the lower portion of the enclosed chamber, the air driving the filled containers to travel upwardly from the lower portion to the upper portion of the enclosed chamber and driving the electrical generator to generate electricity.

According to another aspect of the present invention, there is provided a system for generating electricity by gravity comprising an enclosed chamber, the enclosed chamber being filled with a quantity of liquid therein; an electric generator for generating electricity; a plurality of containers for guided up and down travel between a lower portion and an upper portion of the enclosed chamber, the containers being connected in driving engagement with the electric generator; guide means for guiding the up and down travel of the containers between the lower portion and the upper portion of the enclosed chamber; guard means for releasably retaining the plurality of containers within the enclosed chamber; valve means for filling the containers with pressurized air; and release means for selectively releasing the guard means, wherein, when the release means is activated, the pumped air drives the filled containers to travel upwardly through the liquid from the lower portion to the upper portion of the enclosed chamber; and driving the electrical generator to generate electricity.

According to another aspect of the present invention, there is provided a system for generating electricity by gravity comprising (a) providing an enclosed chamber, the enclosed chamber being filled with a quantity of pressurized liquid therein; (b) providing a plurality of containers for guided up and down travel between a lower portion and an upper portion of the enclosed chamber, the containers being positioned in the lower portion of the enclosed chamber and connected in driving engagement with the electric generator; (c) attaching guide means to the containers, for guiding the up and down travel of the containers between the lower portion and the upper portion of the enclosed chamber;

(d) power means for initially pressurizing the liquid and air, and for engaging and releasing the guide means; (e) engaging guard means to the containers, the guard means being able to releasably retain the plurality of containers within the enclosed chamber; (f) activating valve means to fill the containers with pumped air; (g) providing release means for selectively releasing the guard means, wherein, when the release means is activated, the pumped air drives the filled containers to travel upwardly through the liquid from the lower portion to the upper portion of the enclosed chamber; and driving the electrical generator to generate electricity; (h) providing drain means for releasing the pumped air from the containers at the upper portion of the enclosed chamber, and permitting the containers to fill with the liquid and travel downwardly to return to the lower portion of the enclosed chamber by gravity; and (i) repeating steps (e) to (h) to continue generating electricity.

As previously discussed, the advantage of the present invention is that it provides an improved hydro-electrical generation system able to generate electricity in a waste free and fuel free manner.

A further advantage of the present invention is that it provides an improved hydro-electrical generation system which produces electricity through mechanical generation, by harnessing natural gravitational forces.

BRIEF DESCRIPTION OF THE DRAWINGS

A preferred embodiment of the present invention is described below with reference to the accompanying drawings, in which.

DESCRIPTION OF THE PREFERRED EMBODIMENT

Figure 1:
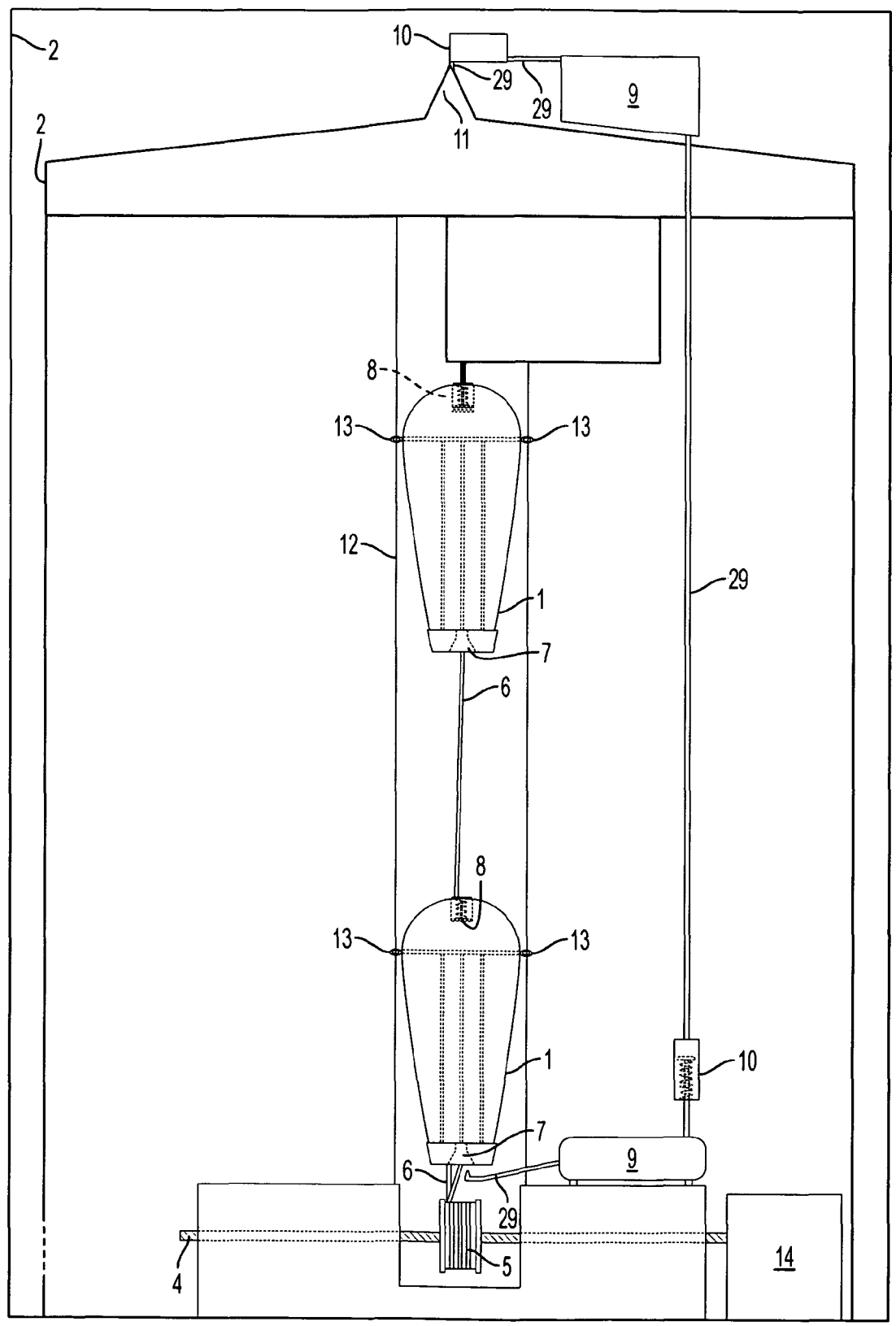
FIG. 1 illustrates an embodiment of the gravity electrical generating system of the present invention.

In a preferred embodiment, and with reference to FIG. 1, the system of the present invention essentially comprises a plurality of vessels (1) positioned at the bottom of a deep, enclosed chamber (2). Preferably, the chamber is a tank like structure that is 100-300 feet deep.

In a preferred embodiment, the chamber (2) will be full of pressurized water. In a preferred embodiment, each vessel (1) is a long and cylindrical plastic container (though other variations can be effected), and has 1 valve on the top (8) and open inverted funnels at the bottom (7) of the vessel, that regulate water and air flow.

Each vessel (1) collects the released air directly below the inverted funnels, as hereinafter described, while being held by the crankshaft airlock (3), from an air pump or tank (9) rigged along the bottom of the string of vessels. Each vessel (1) is also tethered to a tracking cable (12) by a tracking loop (13), and has a respective recoil retention cable (6) that is spun around the crankshaft (4) in a mounted spool (5). In a further embodiment, to further hold the vessels until it is desired to release them, a crankshaft airlock (not shown) can also be utilized. Once each vessel is full of air, the crankshaft airlock (3) is released, the crankshaft brake or guard (if utilized) is released, the retention cable unwinds from around the mounted spool (5) and the vessel (1) rushes to the surface, its upward movement being guided along the tracking cables (12). It is to be understood that the tracking cables (12) extend for a substantial portion of the length within the chamber (2), between the top and the bottom of the chamber, so as to restrict the vessel's movement therealong when the vessels are released. It should also be understood that a "string" of vessels, as referred to herein, refers to a plurality of vessels that are attached to the same crankshaft (4).

When a string of vessels is released, the collective force of retention cables (6) unwinding from around the mounted spool (5) of each vessel will turn the crankshaft (4), that will in turn be connected to a transmission, where numerous crankshafts will connect. The transmission is then connected to a generator (14). In a preferred embodiment, each string in a unit will be released in sequence to generate constant mechanical generation. Preferably, the vessels (1) in a string are 10-15 foot vessels able to generate thousands of pounds of torque when released. It should also be noted that the system of the present invention is designed for large scale use. In an embodiment of the present invention, and with a view to keeping a backup system to keep pressure up in the Air Transfer System, a compressor could be utilized, such as a solar powered compressor, that would come on when needed, as would be apparent to one skilled in the art. In one embodiment of the present invention, the vessels can be a hard plastic barrel-ish type of container, but can, in an alternative embodiment, for example, also be a soft plastic air bag, with all the same parts (cable retention loops, air input funnels, air output valve) but such an air bag would flood to some respect with water, but mostly collapse when it made it to the top of the motion path. This type of structure would provide far less drag when it is being pulled down by the upcoming vessels.

At the top of the string's extension, at the upper portion of the chamber, an apparatus (not shown) will engage a valve (8) at the top of the vessel (1), allowing it to flood, and be pulled back into (sink back into) the starting position at or near the bottom of the tank or chamber (2). The air escaping the vessel (1) at the top of its extension will collect at the highest point of the arced roof in the chamber (2) and will pressurize the top of the tank (11), until it exceeds the connecting Pressure Relief valve (10), which will release it into the air tank when the desired pressure is collected (9). In this manner, because the entire system is pressurized, none of the air pressure is lost; rather, it is just captured somewhere in the system. As long as the system remains sealed, the pressure will be maintained, and a pressurized air flow path will ensue from the top of the tank (11), through the connective PRV valve (10), for release into the air tank (9) and then for reinsertion back into vessels in the starting position at or near the bottom of the tank or chamber (2). The movement of each vessel back into the starting position at or near the bottom of the tank or chamber (2) is assisted by the release of alternate group of vessels that are connected to the same string (spring recoiled retention cable connected to each crankshaft) (4).

Once the vessel is in place at the starting position at or near the bottom of the tank or chamber (2), the crankshaft airlock are re-applied, and the crankshaft brake or guard (if utilized) is applied to hold the vessels in place while each vessel is collecting released (being pumped with air). In pumping the vessels with air, the inverted funnels (7) of the vessel will align directly atop of the air input wand, the air input wand being attached to an air cable (not shown) for releasing via computer control pressurized air therealong from one of various lower air tanks (9), filling the vessel with air through the inverted funnels (7). In a further embodiment, the wand is held by springs (not shown) on the corners thereof, so that it moves when in contact with the vessel.

Figure 3:
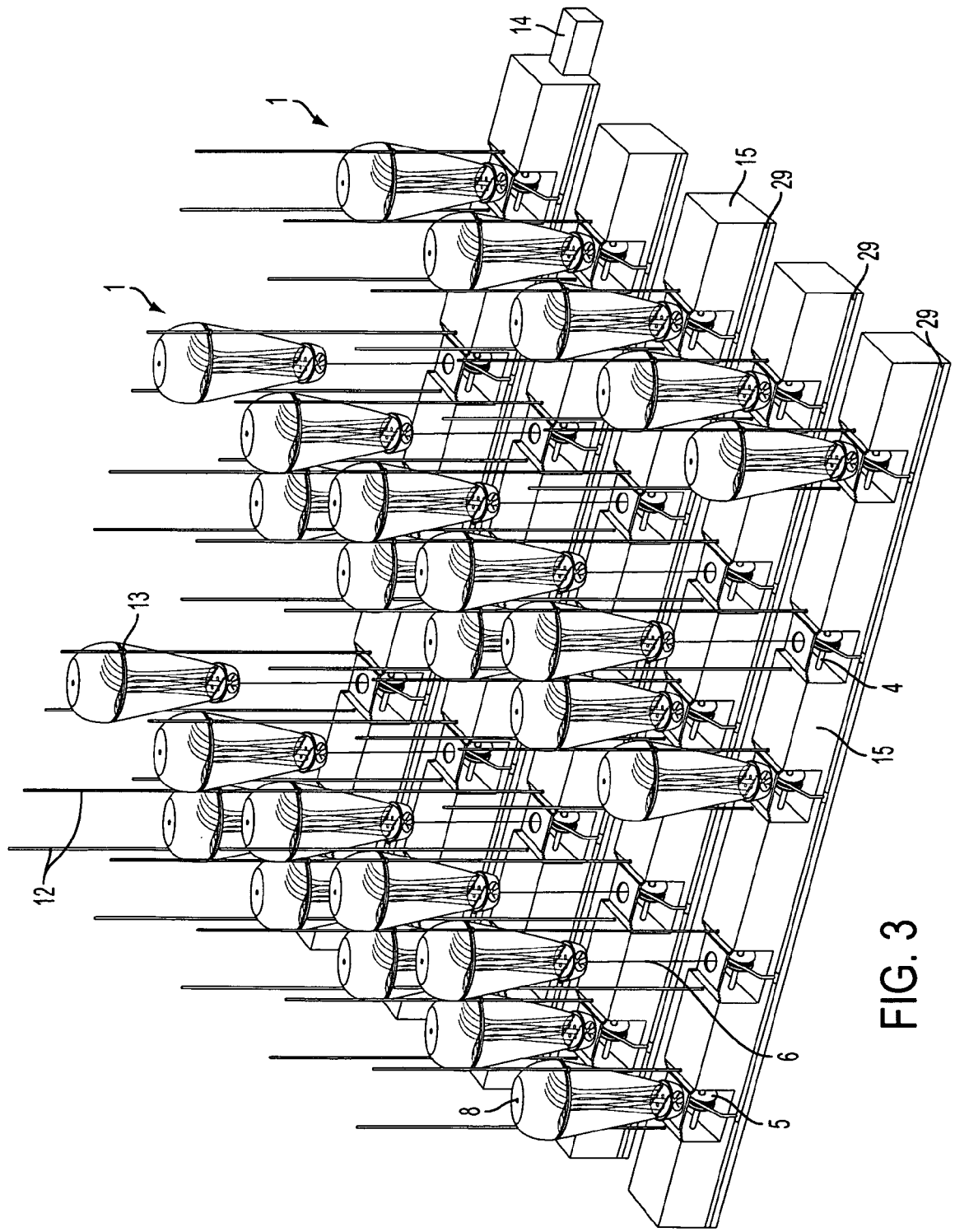
FIG. 3 illustrates an alternative embodiment of the gravity electrical generating system of the present invention.
Figure 3A:
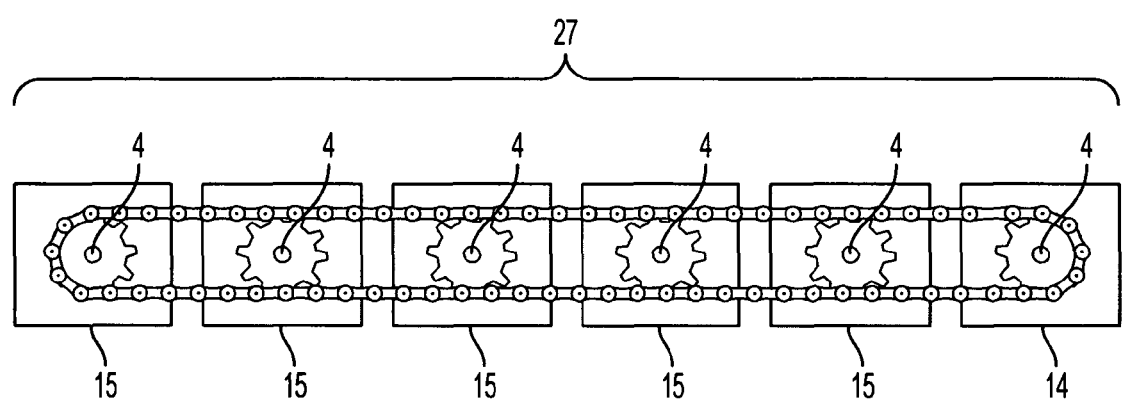
FIG. 3A illustrates an embodiment of a transmission chain, for use in the embodiment of the gravity electrical generating system shown in FIG. 3.

In another embodiment, and with reference to FIGS. 3 and 3A, the system of the present invention essentially comprises a plurality of vessels (1) positioned at the bottom of a deep, enclosed chamber. In one embodiment of the present invention, there should be 6 vessel strings (though FIG. 3 illustrates each string as having 5) and one connected generator (14), with both side a and B shown in FIG. 3 as being identical, though it will be understood that variations to this configuration are possible. As shown in FIG. 3A, the vessels are connected to the transmission (27) with a freewheel, like that of a bicycle, to allow the string to transfer mechanical energy when engaged, and have no resistance when stopped or in reverse. In a preferred embodiment, each string (15) is comprised of 2 sets of 3 vessels, group A and B. The purpose of having 2 groups in each string is to allow group A to retract group B that is fully extended in the system. For example, if the group A vessels in a string are the bottom vessels that are filled with air, and the top group is then flooded, the upward thrust created from the bottom group A vessels rushing to the surface will be enough to pull down the flooded vessels B back to starting position and to transfer energy into the transmission. With a strategic release of the strings, there will be a consistent mechanical energy created to each generator.

In this embodiment, to start the automated process, the lower air tanks will be pressurized to capacity by external forces, as well as an undetermined amount to the top air tank. Once vessel string group will start at the portion of the chamber, while the alternate vessel string group will start at the bottom. The first lower air tank will be accessed by the computer controller air release system to release air at a into the string specific air release piping system. The air will be released into the chamber directly under the awaiting crankshaft airlock engaging the lock, and then into the vessel string group at the bottom by collecting through the intake funnels at the bottom of each vessel until the vessel collects enough air to displace all the water that was flooding it. Each air tank will be accessed until all contained air is released into the system. The computer controlled air release switcher will then move onto the next available lower air tank to be released into the system.

The computer controlled air release switcher will disengage the crankshaft airlock, releasing the vessel string group to travel upwards via buoyant forces, at the same time recoiling the alternate string group to starting positions. When the vessel string group reaches the highest point of the motion path, the vessels top valve will be engaged by the top valve engagement system, releasing all the captured air. The computer controlled air release system will once again engage the crankshaft air lock. The released air from the string group will pass through the top valve engagement system and travel upward into the air collection cap. Because the air collection cap is a narrow gap created between the chambers pressured water and the first pressure relief, its pressure will continue to grow substantially with the each string vessel groups release within the system.

Once enough pressure has been collected in the air collection cap, the first pressure relief valve will be engaged and will transfer the air into the upper air tank. The upper tank is double the size of the numerous lower air tanks. Once the upper air tank has had enough air transferred into it through the operations of the multiple strings of vessels being released in the chamber, it will then engage the second pressure relief valve. The computer controlled air channel switcher will select the appropriate empty lower air bank to fill and will disperse half of the total pressure collected from the upper air bank. Of course, there will be more lower air tanks than strings of vessels so that there will always be enough captured air in the system to be released. No matter what stage the air is captured at, there will always be more being released to continue the transfer through the automated process. Because the entire system is enclosed, no air will evaporate or be lost in the system.

Figure 2:
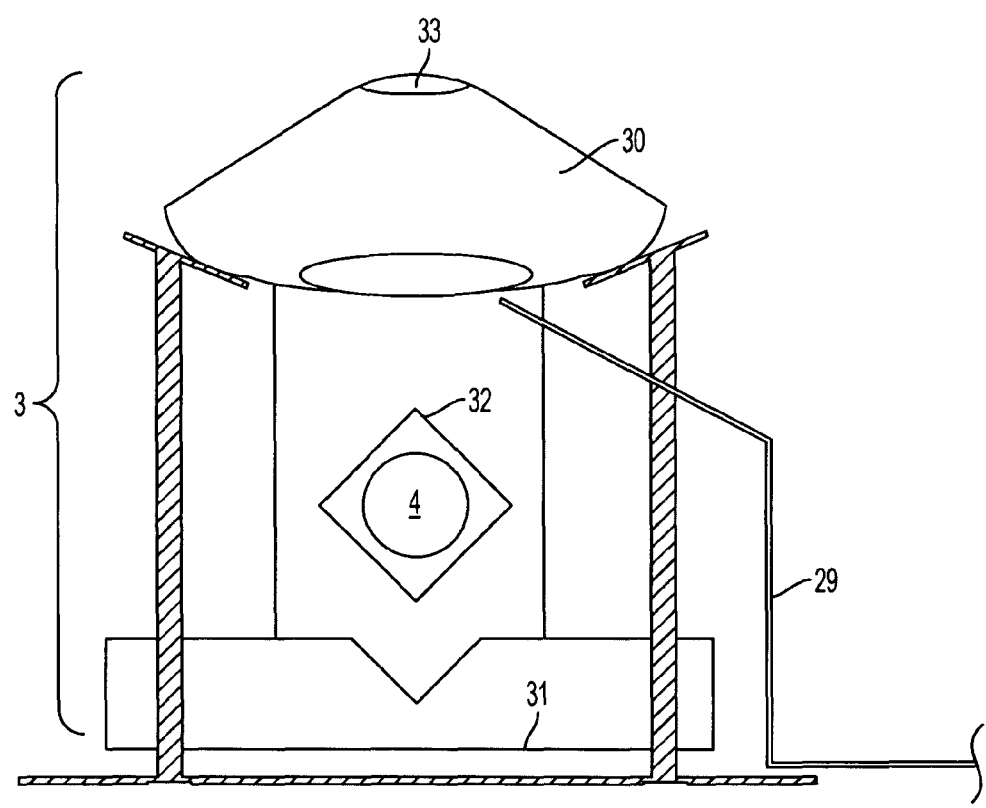
FIG. 2 illustrates an embodiment of a crankshaft brake for the gravity electrical generating system of the present invention.

In another embodiment of the present invention, and with reference to FIG. 2, the crankshaft lock can be, for example, a sliding plate that will be lifted by a smaller vessel being filled with air, so that it is lifted and comes into contact with crankshaft and physically stops it from rotating. The crankshaft will preferably have a plate on it at this location, so that the airlock has a large rigid object to come into contact with. Once the crankshaft airlock is no longer needed, a small valve at the top will open via computer control, releasing the small amount of captured air, allowing the springs that are holding the bottom of the airlock to return to its starting position. There will be a physical obstructing blocking the air capturing portion of the air lock to fall onto the now rotating crankshaft. For example, when the vessels of Group A reach the highest point in the motion path, and engage the air valve to flood the vessel, the air piping (29) will start to release air into the air collection cap (30), which lifts the attached crankshaft brake (31) into contact with the crankshaft brake plate (32), stopping the crankshaft's rotation. The air collection cap (30) will remain filled and brake engaged until all the vessels of group B are filled with air and ready for release. The air release valve (33) will open via computer control, releasing all captured air, disengaging the crankshaft brake, and allowing the air collection cap to rest on the stand stopping it from coming into contact with the rotating crankshaft.

The system's only power input would be to initially pressurize the air and water pressure, and to engage/release the crankshaft brake. In so doing, small amounts of electricity will be required to start the process, or engage/release the crankshaft brake, but once operational, the system will be fully automated, and maintenance will only need to be performed when necessary, allowing practically constant operations.

The present invention has been described herein with regard to preferred embodiments. However, it will be obvious to persons skilled in the art that a number of variations and modifications can be made without departing from the scope of the invention as described herein.

I claim:

1. A system for generating electricity by gravity comprising:
    an enclosed chamber, the enclosed chamber being filled with a quantity of liquid therein;
    an electric generator for generating electricity;
    a plurality of containers for guided up and down travel between a lower portion and an upper portion of the enclosed chamber, the containers being connected in driving engagement with the electric generator;
    guide means for guiding the up and down travel of the containers between the lower portion and the upper portion of the enclosed chamber, wherein the containers are connected to the guide means by a tracking cable loop, the tracking cable loop being attached to an outer surface of each of the containers;
    a crankshaft connected to the electric generator, wherein each of the plurality of containers are connected to the crankshaft by means of a retention cable wound around a mounted spool; and
    valve means for filling the containers with air when the containers attain a position in the lower portion of the enclosed chamber, wherein, the air drives the filled containers to travel upwardly through the liquid from the lower portion to the upper portion of the enclosed chamber, and the retention cable is unwound from the mounted spool and rotates the crankshaft so as to drive the electrical generator to generate electricity.

2. The system of claim 1, wherein the plurality of containers are positioned in side-by-side relationship.

3. The system of claim 1, wherein the guide means extend a substantial length within the enclosed chamber, between the lower portion and the upper portion of the enclosed chamber.

4. The system of claim 3, wherein the guide means is a tracking cable.

5. The system of claim 1, wherein a plurality of crankshafts are connected to the electric generator.

6. The system of claim 1, wherein each one of the plurality of containers further comprises an air input connection on an upper surface thereof and an air output connection on a lower surface thereof.

7. The system of claim 1, wherein the valve means further comprises an air input wand, the air input wand being attached to an air cable for transferring pressurized air therealong from an air tank.

8. The system of claim 7, wherein the air tank is positioned within the enclosed chamber.

* * * * *